3,165,536
PRODUCTION OF 2,5-DIHYDROFURAN
Max Strohmeyer, Ludwigshafen (Rhine), Germany, assignor to Badische Anilin- & Soda-Fabrik Aktiengesellschaft, Ludwigshafen (Rhine), Germany
No Drawing. Filed June 25, 1962, Ser. No. 205,076
Claims priority, application Germany, June 29, 1961, B 63,079
4 Claims. (Cl. 260—346.1)

This invention relates to a new process for the production of 2,5-dihydrofuran.

2,5-dihydrofuran is known to be a useful starting material for the production of insecticides. For this purpose it is first reacted with hexachlorocyclopentadiene in a diene addition reaction. The 2,5-dihydrofuran must be very pure for this reaction.

According to British patent specification No. 510,615, 2,5-dihydrofuran is obtained by heating cis-butene-(2)-diol-(1,4) with non-volatile liquid acids or with acids dissolved in water. The yields in this process, which is carried out in the liquid phase, are, however, unsatisfactory. Thus crotonaldehyde is formed, for example, as a by-product in an amount comparable to that of the 2,5-dihydrofuran.

A process is described in British patent specification No. 510,949 according to which non-volatile solid catalysts with a dehydrating effect are employed for the same reaction. According to Example 1 of this patent, 2,5-dihydrofuran is obtained in a yield of 72% of the theory when the process is carried out in the gas phase using granulated aluminum oxide. The yield is lower when the process is carried out with granulated aluminum oxide as catalyst in the liquid phase, as described in Example 2. Apart from the unsatisfactory yields, the reaction products are not pure enough for present-day requirements. They contain approximately 2% furan, 0.3% 2,3-dihydrofuran, 6.5% tetrahydrofuran, 5.5% crotonaldehyde and only about 85% of 2,5-dihydrofuran. In addition, they yield brownish-black diene adducts with hexachlorocyclopentadiene. The purification of these adducts is difficult and can only be carried out with considerable loss in yield. The tetrahydrofuran which is produced from butane-diol-(1,4), present as impurity in the starting material and formed from butene-(2)-diol-(1,4) by a reaction whose mechanism is unknown, can hardly be separated by distillation. This also applies to the crotonaldehyde which moreover tends to resinify under the conditions of the distillation and therefore interferes with continuous purification by distillation. In addition, the throughput in the process described in British patent specification No. 510,949 is unsatisfactory. Thus, in Example 1 only 100 g. cis-butene-(2)-diol-(1,4) is reacted per liter of catalyst per hour. Very large reaction vessels are therefore necessary if the process is to be carried out on a commercial scale.

An object of this invention is to provide a process according to which 2,5-dihydrofuran is obtained in good yield by dehydration of butene-(2)-diol-(1,4). A further object of the invention is to provide a process according to which 2,5-dihydrofuran is obtained with a high degree of purity. Another object of the invention consists in finding a process which provides for high throughputs and therefore high space-time yields, so that satisfactory results are obtained in small vessels. Other objects and advantages of the invention will become apparent from the following description.

In accordance with this invention these objects and advantages are achieved by the dehydration of cis-butene-(2)-diol-(1,4) in the presence of an aluminum oxide catalyst which has an average particle size of 0.01 to 1 mm., at elevated temperature, the cis-butene-(2)-diol-(1,4) being present in the liquid phase.

2,5-dihydrofuran is obtained in yields in excess of 90% of the theory by the process described in the invention. Surprisingly, not only is the throughput several times higher than that hitherto achieved but also the by-products are formed in much smaller quantities. Thus, the proportion of tetrahydrofuran is reduced to approximately 1.5 to 2%, while the furan proportion is reduced to approximately 0.1 to 0.3%. 2,3-dihydrofuran and crotonaldehyde are only present in traces in the reaction product. A further advantage of the new process is that the dehydration is carried out at temperatures lower than those employed in gas phase dehydration so that the life of the catalyst is extended. As a result of the small proportion of crotonaldehyde in the reaction product there is no risk of blockage of the distillation equipment by products formed from crotonaldehyde. It is surprising that reduced throughput and space-time yields are obtained both with coarse and fine grained catalysts.

It is not necessary to employ pure cis-butene-(2)-diol-(1,4) as starting material for the process according to the invention and technical products can be employed such as are obtained by partial hydrogenation of butyne-(2)-diol-(1,4) with poisoned palladium catalysts. This technical cis-butene-(2)-diol-(1,4) normally contains a few percent of butane- and butyne-(2)-diol-(1,4) together with approximately 5% transbutene-(2)-diol-(1,4).

The preferred aluminum oxide catalysts are those with an average particle size between 0.02 and 0.3 mm. Good results are obtained, for example, with an aluminum oxide with the following particle size distribution:

| | Percent |
|---|---|
| Above 0.3 mm. | 2.0 |
| Above 0.2 mm. | 14.5 |
| Above 0.1 mm. | 50.6 |
| Above 0.075 mm. | 60.6 |
| Above 0.05 mm. | 95.5 |
| Below 0.05 mm. | 4.3 |

It is noteworthy that catalysts obtained by heating bayerite, preferably at a temperature between approximately 400° and 600° C., enable substantially higher throughouts to be obtained than aluminum oxide catalysts from other sources. It is known that by precipitating aluminum salt solutions with bases, amorphous aluminum hydroxides with varying water content, termed hydrated aluminum oxides, are obtained. These undergo transition into the rhombic boehmite, which then changes into the hexagonal bayerite. This then changes into monoclinic hydrargillite which has the lowest energy. Good results are also obtained with aluminum oxides which are produced from hydrated aluminum oxide, boehmite and hydrargillite. The process with an aluminum oxide produced from bayerite is, however, preferred.

The process is preferably carried out at a temperature between 160° and 240° C. If the process is carried out at atmospheric pressure, which is simplest from the technical point of view, then the temperature should preferably be maintained between 170° and 190° C. At temperatures above 185° C. increasing quantities of cis-butene-(2)-diol-(1,4) distill over. This tendency can, however, be counteracted by the use of increased pressure.

The reaction according to the new process is carried out, for example, by introducing cis-butene-(2)-diol-(1,4) and the catalyst, advantageously in an amount of 1 to 60, preferably of 2 to 30, percent by weight, calculated on the starting material, into a reaction vessel. The mixture is then heated to the reaction temperature. It is important that the catalyst should be maintained in a state of satisfactory suspension in the cis-butene-(2)-diol-(1,4). This is achieved, for example, by vigorous stirring, by the passage of a current of an inert gas, or by a combination of both methods. It is advisable in any case to carry out the reaction in an inert gas atmosphere, for example, under nitrogen, carbon dioxide, carbon monoxide, or argon, as the formation of peroxides is thus prevented. The 2,5-dihydrofuran and the water which is split off distill over as they are formed and fresh starting material is added to the reaction vessel. The 2,5-dihydrofuran is dried in the usual way, for example, with the aid of drying agents such as calcium chloride or potassium carbonate or by azeotropic distillation.

The invention is further illustrated by, but not limited to, the following examples in which parts are by weight. These are related to parts by volume as g. to cc.

*Example 1*

Technical cis-butene-(2)-diol-(1,4)- is dehydrated. The product contains 89% by weight cis-butene-(2)-diol-(1,4), 5% by weight trans-butene-(2)-diol-(1,4) while the balance consists essentially of butane- and butyne-(2)-diol-(1,4). 500 parts of the starting material and 33 parts (approximately 50 parts by volume) aluminum oxide powder obtained from bayerite with a particle size distribution as given in the table above (average particle size 0.085 mm.) are introduced into a vessel fitted with a distillation head and provided with a stirrer. The mixture is heated to 185° C. with vigorous stirring with the passage of a slow stream of nitrogen. 2,5-dihydrofuran and water distill over continuously, the temperature of the vapors being between 100° and 110° C. 55 parts technical cis-butene-(2)-diol-(1,4) is fed into the reaction vessel per hour so that the liquid level remains constant. The throughput is thus approximately 1.120 parts cis-butene-(2)-diol-(1,4) per part by volume of catalyst per hour.

The reaction is interrupted after 15.3 hours, no reduction in the activity of the catalyst being observed.

688 parts low boiling products with a boiling point below 75° C. is obtained from the distillate. This material consists essentially of the azeotrope of 2,5-dihydrofuran and water. 539 parts 2,5-dihydrofuran, B.P., 65° to 68° C., is obtained from this azeotrope by drying followed by distillation of the dried organic phase. More than 95% of this quantity of 2,5-dihydrofuran distills at 65.5° to 66.5° C. 15 parts unreacted cis-butene-(2)-diol-(1,4) is also recovered. The 539 parts 2,5-dihydrofuran has been shown by gas chromatographic analysis to have the following composition:

98.01% 2,5-dihydrofuran, 1.63% tetrahydrofuran, 0.12% furan, together with traces of 2,3-dihydrofuran and crotonaldehyde.

528 parts pure 2,5-dihydrofuran has thus been produced from 750 parts cis-butene-(2)-diol-(1,4) contained in the 840 parts technical cis-butene-(2)-diol-(1,4) employed. The yield is thus 90.5% of the theory if allowance is made for the 15 parts cis-butene-(2)-diol-(1,4) recovered.

*Example 2*

The procedure is the same as in Example 1 but catalysts with different particle size are used. The results are as given in the following table:

| Catalyst | Temperature, °C. | Duration of experiment, minutes | Ratio of cis-butene-(2)-diol-(1,4) converted in parts/parts by volume catalyst and hour |
|---|---|---|---|
| Aluminum oxide from bayerite, 4 mm. pellets | 185 | 40 | 700 |
| Aluminum oxide from bayerite, powder with average particle size of 0.085 mm. | 185 | 40 | 2,385 |
| Aluminum oxide from bayerite, powder with average particle size of 0.006 mm. | 185 | 40 | 276 |

*Example 3*

The procedure is the same as in Example 1, but a catalyst obtained from bayerite and a catalyst obtained from boehmite are used.

| Catalyst | Temperature, °C. | Duration of experiment, hours | Ratio of cis-butene-(2)-diol-(1,4) converted in parts/parts by volume catalyst and hour |
|---|---|---|---|
| Aluminum oxide from bayerite, average particle size 0.085 mm. | 185 | 6.7 | 1,416 |
| Aluminum oxide from boehmite, average particle size 0.085 mm. | 185 | 6.0 | 497 |

*Example 4*

The procedure is the same as in Example 1, but an aluminum oxide catalyst from bayerite with an average particle size of 0.085 mm. is used. The reaction temperature is varied and the following results are obtained:

| Temperature, °C. | 2,5-dihydrofuran in the distillate, percent | 2,3-dihydrofuran in the distillate, percent | Furan in the distillate, percent | Crotonaldehyde in the distillate, percent | Cis-butene-(2)-diol-(1,4) in the distillate, percent |
|---|---|---|---|---|---|
| 185 | 93.2 | Trace | 5.7 | 0.4 | 2.3 |
| 200 | 72.4 | 0.04 | 0.5 | 1.2 | 20.9 |
| 218 | 35.6 | 0.16 | 0.95 | 1.2 | 60.1 |

What I claim is:

1. A process for the production of 2,5-dihydrofuran which comprises splitting off water from cis-butene-(2)-diol-(1,4) on an aluminum oxide catalyst whose average particle size is between 0.01 and 1 mm., at a temperature between 160 and 240° C., said cis-butene-(2)-diol-(1,4) being maintained in the liquid phase.

2. A process according to claim 1, which comprises carrying out the reaction under atmospheric pressure and at a temperature between 170 and 190° C.

3. A process according to claim 1, which comprises using an aluminum oxide catalyst with an average particle size between 0.02 and 0.3 mm.

4. A process according to claim 1 which comprises using an aluminum oxide produced by heating bayerite.

References Cited in the file of this patent

FOREIGN PATENTS 510,949     Great Britain  _____ Aug. 8, 1939

UNITED STATES PATENT OFFICE
CERTIFICATE OF CORRECTION

Patent No. 3,165,536                January 12, 1965

Max Strohmeyer

It is hereby certified that error appears in the above numbered patent requiring correction and that the said Letters Patent should read as corrected below.

Column 2, line 50, for "throughouts" read -- throughputs --.

Signed and sealed this 22nd day of June 1965.

(SEAL)
Attest:

ERNEST W. SWIDER
Attesting Officer

EDWARD J. BRENNER
Commissioner of Patents